(12) United States Patent
Chu et al.

(10) Patent No.: US 9,950,455 B2
(45) Date of Patent: Apr. 24, 2018

(54) WAVEGUIDES

(71) Applicant: City University of Hong Kong, Kowloon (HK)

(72) Inventors: Sai Tak Chu, Kowloon (HK); Jacky Ping Yuen Tsui, Kowloon (HK); Peng Zhou, Kowloon (HK); Edwin Yue Bun Pun, Kowloon (HK)

(73) Assignee: City University of Hong Kong, Kowloon (HK)

( * ) Notice: Subject to any disclaimer, the term of this patent is extended or adjusted under 35 U.S.C. 154(b) by 88 days.

(21) Appl. No.: 14/832,305

(22) Filed: Aug. 21, 2015

(65) Prior Publication Data

US 2016/0031170 A1 Feb. 4, 2016

Related U.S. Application Data

(63) Continuation of application No. 13/934,437, filed on Jul. 3, 2013, now abandoned.

(51) Int. Cl.

| | |
|---|---|
| *B29C 45/00* | (2006.01) |
| *G02B 6/10* | (2006.01) |
| *H01P 5/18* | (2006.01) |
| *H01P 3/16* | (2006.01) |
| *H01P 11/00* | (2006.01) |
| *B29D 11/00* | (2006.01) |
| *G02B 1/04* | (2006.01) |
| *G02B 6/138* | (2006.01) |
| *B29K 23/00* | (2006.01) |

(52) U.S. Cl.
CPC ........ *B29C 45/00* (2013.01); *B29D 11/00663* (2013.01); *G02B 1/046* (2013.01); *G02B 1/048* (2013.01); *G02B 6/102* (2013.01); *H01P 3/16* (2013.01); *H01P 5/188* (2013.01); *H01P 11/006* (2013.01); *B29K 2023/06* (2013.01); *B29K 2023/12* (2013.01); *G02B 6/138* (2013.01)

(58) Field of Classification Search
CPC .. B29D 11/00663; G02B 1/046; G02B 1/048; G02B 6/102; G02B 6/138; B29K 2023/06; B29K 2023/12; H01P 3/16; H01P 11/006; B29C 45/00
USPC .......................... 264/1.1, 1.24; 333/135, 157
See application file for complete search history.

(56) References Cited

U.S. PATENT DOCUMENTS

| | | |
|---|---|---|
| 5,380,386 A | 1/1995 | Oldham et al. |
| 5,398,010 A | 3/1995 | Klebe |
| 6,323,818 B1 | 11/2001 | Koh et al. |

(Continued)

FOREIGN PATENT DOCUMENTS

| | | |
|---|---|---|
| CN | 101577358 B | 11/2009 |
| CN | 101630040 B | 1/2010 |

(Continued)

OTHER PUBLICATIONS

Brochure of TopasTM material, Ticona, 8040 Dixie Highway, Florence, Kentucky 41042, USA, 2005.*

(Continued)

*Primary Examiner* — Benny Lee
*Assistant Examiner* — Hafizur Rahman
(74) *Attorney, Agent, or Firm* — Renner Kenner Greive Bobak Taylor & Weber

(57) ABSTRACT

A dielectric waveguide comprising a dielectric probe at each end, wherein the dielectric probes are arranged to transfer energy.

8 Claims, 3 Drawing Sheets

(56) References Cited

U.S. PATENT DOCUMENTS

| | | |
|---|---|---|
| 7,106,933 B2 | 9/2006 | Han |
| 7,315,678 B2 | 1/2008 | Siegel et al. |
| 7,409,132 B2 | 8/2008 | Sun et al. |
| 8,009,951 B2 | 8/2011 | Han |
| 8,009,952 B2 | 8/2011 | Han |
| 9,190,706 B2 * | 11/2015 | Nath ................ G02B 6/125 |
| 2003/0053770 A1 * | 3/2003 | Noddings ........ B29D 11/00663 |
| | | 385/95 |
| 2006/0165360 A1 | 7/2006 | Siegel et al. |
| 2010/0135626 A1 * | 6/2010 | Sun ..................... H01P 3/16 |
| | | 385/123 |
| 2013/0104387 A1 * | 5/2013 | Ma ..................... H01P 11/003 |
| | | 29/601 |

FOREIGN PATENT DOCUMENTS

| | | |
|---|---|---|
| CN | 101788695 A | 7/2010 |
| CN | 102162876 A | 10/2011 |

OTHER PUBLICATIONS

Dr. Alan Smale, "Regions of the Electromagnetic Spectrum", HEASARC, Astrophysics Science Division, NASA/GSFC,Nov. 2013.*

Technical note of JobShop, "Two shot Plastic Injection Molding", May 2, 2007, pp. 1.*

* cited by examiner

WAVEGUIDES

CROSS REFERENCE TO RELATED APPLICATION

The present application is a Continuation of U.S. application Ser. No. 13/934,437, filed Jul. 3, 2013, now abandoned, the entirety of which is incorporated herein by reference.

TECHNICAL FIELD

The present invention relates to waveguides, and particularly, although not exclusively, to low cost dielectric waveguides for sub-millimeter/Terahertz (sub-mm/THz) applications.

BACKGROUND

Waveguides are an indispensable technology that is widely used in different technology fields, such as wireless and wire-line communications, metrology, as well as, sensing and security. In particular, dielectric waveguides have been used in transmission line applications, as well as in waveguide circuits to confine, process and transmit light over various distances. For example, dielectric waveguides are used to transmit light over thousands of kilometers (km) in long-distance fiber-optic transmission. In another application, dielectric waveguides are used in integrated photonics for light processing and transmission over tens or hundreds of micrometers (μm).

Dielectric waveguides formed of different size, shape, and materials are required for different applications. For sub-millimeter/Terahertz frequency applications of guided-waves, waveguide circuits with small dimension are desired in order to satisfy the associated single-mode and modal-operation conditions. However, the fabrication of small dimension waveguides, especially those made with metallic material, is particularly challenging. Moreover, metallic waveguides for sub-millimeter/terahertz frequency applications are relatively inflexible and costly to manufacture.

SUMMARY OF THE INVENTION

In accordance with a first aspect of the present invention, there is provided a dielectric waveguide comprising a dielectric probe at each end, wherein the dielectric probes are arranged to transfer energy.

In an embodiment of the first aspect, a core or a cladding or both the core and the cladding of the dielectric waveguide are made of polymeric materials.

In an embodiment of the first aspect, the polymeric materials include thermoplastics or a combination of thermoplastic materials.

In an embodiment of the first aspect, the polymeric materials include one of polyethylene or polypropylene or combinations thereof.

In an embodiment of the first aspect, the dielectric waveguide is fabricated by injection molding.

In an embodiment of the first aspect, the dielectric waveguide is fabricated in a single mold.

In an embodiment of the first aspect, the dielectric waveguide is a planar waveguide.

In an embodiment of the first aspect, the dielectric probes are tapered.

In an embodiment of the first aspect, the dielectric probes have a linear tapered form.

In an embodiment of the first aspect, the dielectric waveguide is arranged to operate at sub millimeter (Sub-mm) or terahertz (THz) frequencies.

In an embodiment of the first aspect, the terahertz (THz) frequencies comprise frequencies larger than 60 GHz.

In an embodiment of the first aspect, the dielectric waveguide has a propagation loss less than 0.5 dB/cm.

In an embodiment of the first aspect, the dielectric waveguide is fabricated in multiple molds.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
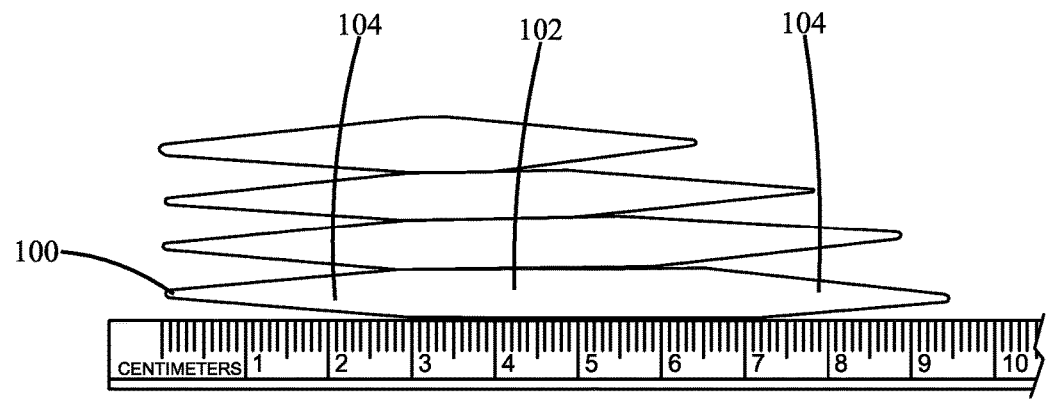
FIG. 1 shows a plurality of dielectric waveguides having different dimensions in accordance with one embodiment of the present invention.

Referring to FIG. 1, there is illustrated an embodiment of a dielectric waveguide comprising a dielectric probe at each end, wherein the dielectric probes are arranged to transfer energy.

In this embodiment, the waveguide 100 is a dielectric waveguide arranged to be used for sub-millimeter/terahertz (sub-mm/THz) frequency applications of guided-waves. Preferably, the operation frequency of the waveguide 100 is above 100 GHz. More preferably, the operation frequency of the waveguide 100 is above 60 GHz. In other embodiments, the dielectric waveguide 100 can be arranged to be used in other frequencies.

Figure 5:
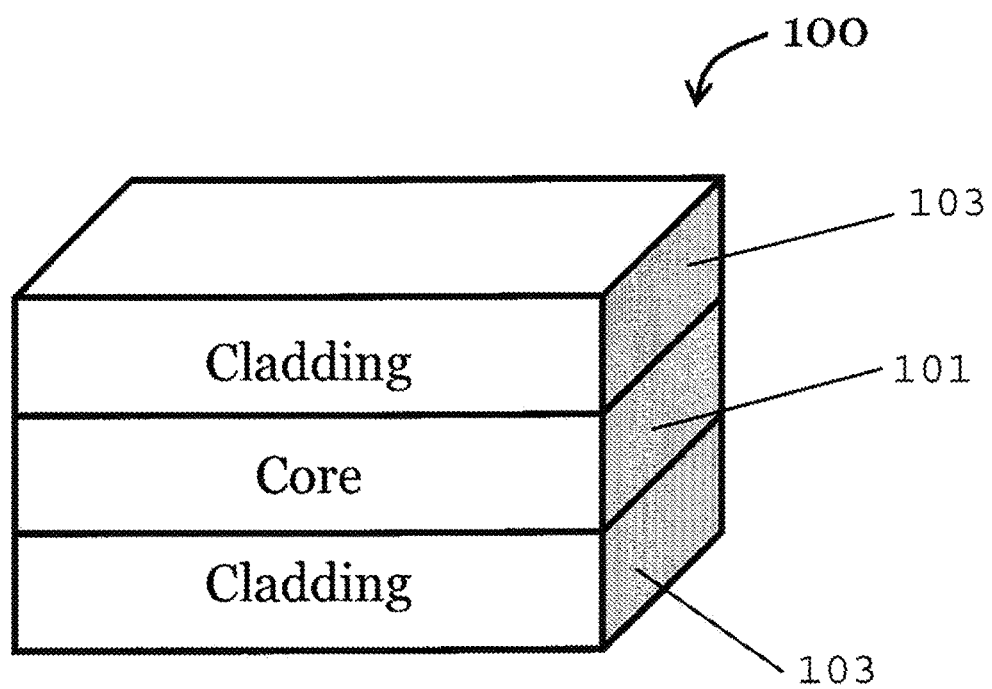
FIG. 5 is a schematic cross-sectional view of a waveguide showing core and cladding layers.

As shown in FIG. 1, each dielectric waveguide 100 has a substantially rectangular portion 102 and two linearly tapered ends 104. In other embodiments, the tapered ends 104 need not be linear and portion 102 of the waveguide 100 need not be rectangular. Portion 102 and the tapered ends 104 can be of any other shape and form. In yet some other embodiments, the dielectric waveguides 100 may not have any tapered ends 104. As shown in FIG. 1, the length of the rectangular portion 102 of the waveguides 100 ranges from about 10 mm to about 40 mm, whereas the length of each tapered end 104 is about 32 mm. However, depending on applications, the lengths of the rectangular portion 102 and the tapered ends 104 can be lengthened or shortened. Preferably, the dielectric waveguide 100 is a planar waveguide having a core 101 sandwiched between cladding layers 103 (FIG. 5). In other embodiments, the dielectric waveguide 100 may be nonplanar and can have other forms.

The dielectric waveguide 100, as shown in FIG. 1, is made of polymeric materials. In particular, in some embodiments, only the core or the cladding of the dielectric waveguide 100 is made of polymeric materials. In some other embodiments, both the core and the cladding of the dielectric waveguide 100 are made of polymeric materials. Preferably, the polymeric materials used to fabricate the dielectric waveguide 100 include thermoplastics or a combination of different thermoplastic materials. In a preferred embodiment, the thermoplastic materials used are polyethylene, polypropylene or combinations thereof. In the embodiment shown in FIG. 1, the dielectric waveguides 100 are air-clad polyethylene-core waveguides fabricated by injection molding in a single mold. Alternatively, multiple molds may be used in some other embodiments where the waveguide 100 comprises multiple materials or has a complex structure.

To measure the optical properties of polyethylene and polypropylene materials that can potentially be used to make the dielectric waveguides 100 of FIG. 1, a pulsed THz time-domain spectroscopy (THz-TDS) instrument is used (not shown). Plastic samples in the form of slabs of various thicknesses are measured and their time-domain transmitted signals are compared with reference signals (not illustrated).

Figure 2:
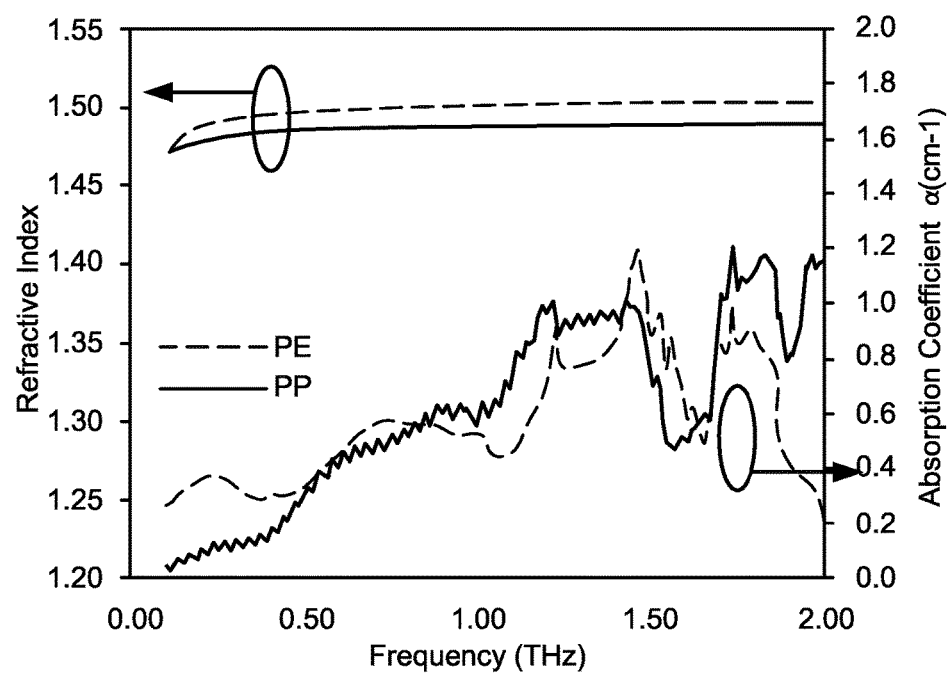
FIG. 2 is a graph showing the measured refractive indices and absorption coefficients in different frequencies for thermoplastic materials (polyethylene and polypropylene) that can be used to fabricate the dielectric waveguides of FIG. 1.

The refractive indices and absorption coefficients ($\alpha$ in $cm^{-1}$) of polyethylene (PE) and polypropylene (PP) materials measured in different frequencies (GHz) are shown in FIG. 2. With reference to the absorption coefficient curves in FIG. 2, both polyethylene and polypropylene exhibit excellent transmission ability, with an absorption coefficient well below 1 $cm^{-1}$ under 1 THz. On the other hand, polyethylene has a slightly higher refractive index than polypropylene over the entire frequency band. This shows that polyethylene and polypropylene are particularly suitable to be used as core and cladding materials in dielectric waveguides. Therefore, with these intrinsic propagation properties, flexible planar dielectric circuits can be made with a combination of different thermoplastics materials such as polyethylene and polypropylene.

Figure 3:
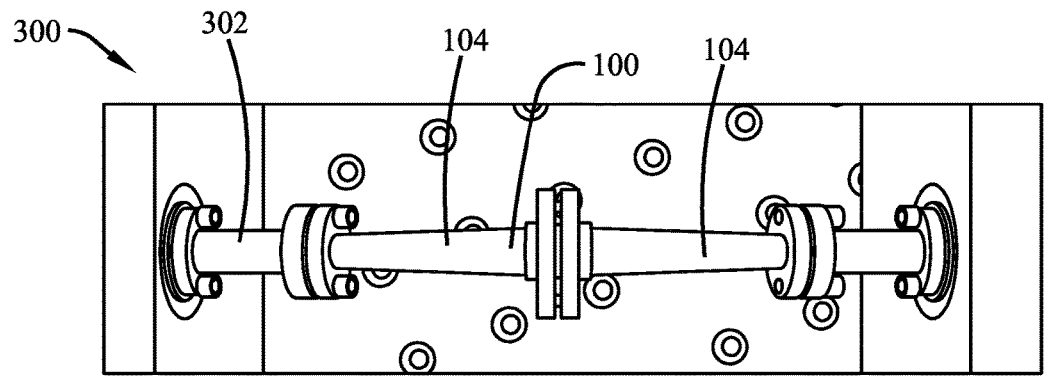
FIG. 3 shows a vector network analyzer (PNA-X) instrumentation with WR-5 and WR-22 metallic tapers for measuring and characterizing operation characteristics of the dielectric waveguides of FIG. 1.

Referring now to FIG. 3, there is shown a robust vector network analyzer (PNA-X) instrumentation 300 arranged to measure and characterize the operation characteristics of the rectangular waveguides 100 of FIG. 1. The PNA-X analyzer 300, with its metallic rectangular waveguide interfaces 302 as I/O ports, presents a challenge in efficiently connecting with the dielectric waveguides 100 under test. To mitigate this problem, the I/O waveguides 302 operating at 140 GHz to 220 GHz are expanded from the standard WR-05 (1.3 mm×0.65 mm) to a larger WR-22 (5.6 mm×2.8 mm) via a commercial mode convertor in the setup.

Since the mode profiles between the metallic waveguides 302 of the analyzer 300 and the dielectric rectangular waveguides 100 are different, dielectric probes 104 that are linearly tapered along the longitudinal direction of the waveguide 100 are arranged at both ends of the dielectric waveguide 100 for transferring energy smoothly to and from the I/O ports 302 over a broad range of frequency. The incorporation of these probes 104 to the dielectric waveguides 100 can be easily accomplished by using injection molding in which complicated structures can be made in a single mold or in multiple molds.

Figure 4:
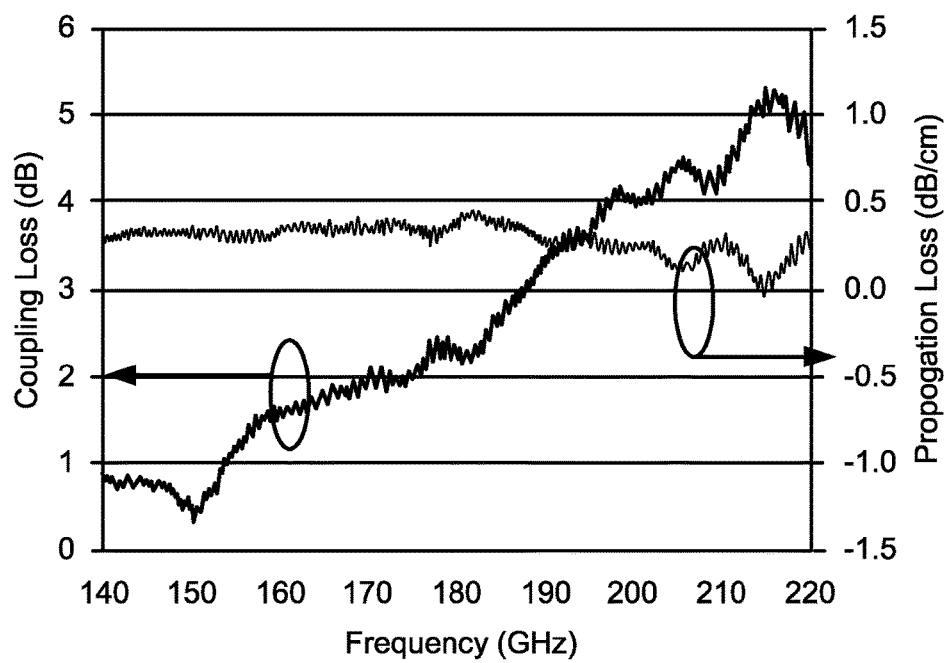
FIG. 4 is a graph showing the operation characteristics (coupling loss and propagation loss) of the dielectric waveguides of FIG. 1 in different frequencies measured using the setup of FIG. 3.

FIG. 4 shows the operation characteristics of the rectangular polyethylene waveguides 100 of FIG. 1 in different frequencies measured using the setup of FIG. 3. In particular, FIG. 4 shows the extracted coupling loss (in dB) of the tapered dielectric probes 104 and the propagation loss (in dB/cm) of the dielectric waveguides 100 over the frequency band (in GHz) of 140 GHz to 220 GHz.

As the coupling loss is due to two transitions, the coupling loss per transition between the metallic and the dielectric waveguides should be halved. As shown in FIG. 4, the coupling loss measured increases proportionally with frequency. This increase in coupling loss is likely due to unwanted excitation of higher order modes into the overmolded dielectric waveguides 100. At frequencies below 170 GHz, the coupling loss can be as low as 1 dB per transition. Since only linearly tapered probes 104 are used in this measurement, one can expect that the coupling loss can be further reduced with an optimized probe design having a different shape and form. The propagation loss for the dielectric waveguide 100 of FIG. 1 is below 0.5 dB/cm over the entire frequency band. This result is comparable to or better than results reported for other waveguide platforms.

The embodiments of the present invention are distinctive in that the thermoplastic dielectric waveguides are produced by injection molding and the dielectric waveguides fabricated have low propagation loss. By using injection molding to manufacture the thermoplastic dielectric waveguides, highly detailed structures can be stamped out with relative ease and at a relatively low cost. Therefore, the dielectric waveguides of the present invention can be mass produced cost effectively. On the other hand, different thermoplastics and blended polymers can be used to manufacture the dielectric waveguides. These different materials may potentially provide valuable new functionalities to waveguide circuits. In sum, these factors together present a versatile and low-cost THz waveguide circuit platform in accordance with the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for fabricating a dielectric waveguide adapted to operate at frequencies between 60 GHz and 1 THz, the dielectric waveguide including a body comprised of a cladding and a core; the method comprising the steps of:
    injection molding both the core and the cladding using a thermoplastic material; and
    forming the body such that the core and the cladding together define a rectangular portion and tapered probe portions arranged at both ends of the rectangular portion;
    wherein the thermoplastic material comprises polyethylene, polypropylene or a combination thereof.

2. The method in accordance with claim 1, wherein the injection molding step is performed only once when the dielectric waveguide is fabricated in a single mold.

3. The method in accordance with claim 1, wherein the injection molding step is repeated when the dielectric waveguide is fabricated in multiple molds.

4. The method in accordance with claim 1, wherein the tapered probe portions are tapered linearly along a longitudinal direction of the dielectric waveguide.

5. The method in accordance with claim 1, wherein the dielectric waveguide produced has a propagation loss of less than 0.5 dB/cm.

6. The method in accordance with claim 1, wherein the dielectric waveguide is a planar waveguide.

7. The method in accordance with claim 6, wherein the cladding comprises two cladding layers, and the core is sandwiched between the two cladding layers.

8. The method in accordance with claim 1, wherein the dielectric waveguide is adapted to operate at frequencies between 140 GHz to 220 GHz.

* * * * *